(12) United States Patent
Wunsche

(10) Patent No.: US 9,120,379 B2
(45) Date of Patent: Sep. 1, 2015

(54) ADAPTIVE INSTRUMENT DISPLAY USING EYE TRACKING

(71) Applicants: DENSO International America, Inc., Southfield, MI (US); DENSO CORPORATION, Kariya-shi, Aichi-ken (JP)

(72) Inventor: Robert Wunsche, Clarkston, MI (US)

(73) Assignees: DENSO International America, Inc., Southfield, MI (US); DENSO CORPORATION, Kariya-shi, Aichi-ken ( * ) Notice: Subject to any disclaimer, the term of this patent is extended or adjusted under 35 U.S.C. 154(b) by 107 days.

(21) Appl. No.: 14/036,572

(22) Filed: Sep. 25, 2013

(65) Prior Publication Data
US 2015/0084764 A1 Mar. 26, 2015

(51) Int. Cl.
*B60Q 1/00* (2006.01)
*B60K 35/00* (2006.01)
*B60R 1/12* (2006.01)

(52) U.S. Cl.
CPC . *B60K 35/00* (2013.01); *B60R 1/12* (2013.01); *B60K 2350/1068* (2013.01); *B60K 2350/1072* (2013.01); *B60K 2350/2013* (2013.01); *B60K 2350/352* (2013.01); *B60K 2350/905* (2013.01); *B60R 2001/1253* (2013.01); *B60R 2300/8006* (2013.01)

(58) Field of Classification Search
None
See application file for complete search history.

(56) References Cited

U.S. PATENT DOCUMENTS

| 5,731,903 | A * | 3/1998 | Cook | 359/633 |
|---|---|---|---|---|
| 7,382,237 | B2 * | 6/2008 | Stoschek et al. | 340/438 |
| 7,460,940 | B2 | 12/2008 | Larsson et al. | |
| 2008/0061954 | A1 * | 3/2008 | Kulas | 340/438 |
| 2009/0015395 | A1 * | 1/2009 | Rahe et al. | 340/461 |
| 2010/0250066 | A1 * | 9/2010 | Eckstein et al. | 701/41 |
| 2011/0175754 | A1 * | 7/2011 | Karpinsky | 340/963 |
| 2013/0009759 | A1 * | 1/2013 | Kinoshita et al. | 340/425.5 |
| 2013/0038434 | A1 * | 2/2013 | Yamada et al. | 340/425.5 |

* cited by examiner

*Primary Examiner* — Kerri McNally
*Assistant Examiner* — Renee Dorsey
(74) *Attorney, Agent, or Firm* — Harness, Dickey & Pierce, P.L.C.

(57) ABSTRACT

An adaptive instrument display includes an instrument cluster displaying a plurality of gauges. A steering wheel has at least one sensor, and there is at least one camera. A processor collects data from the at least one camera and steering wheel sensor and determines a steering wheel position and an occupant's line of sight. An obstructed portion of the instrument cluster is determined based on the steering wheel position and the occupant's line of sight, and the gauges on the instrument cluster are altered based on the obstructed portion.

20 Claims, 8 Drawing Sheets

ADAPTIVE INSTRUMENT DISPLAY USING EYE TRACKING

FIELD

The present disclosure relates generally to instrument panel gauges for automobiles. More particularly, the present disclosure relates to resizing, shifting, and reconfiguring gauges on the instrument panel for visibility.

BACKGROUND

This section provides background information related to the present disclosure which is not necessarily prior art.

Gauges are often used throughout industry to display values of parameters being monitored by a system's sensors. In the automotive industry, a vehicle typically includes an instrument cluster with a plurality of gauges for displaying operating conditions of the vehicle. These gauges can monitor parameters such as vehicle speed, engine speed, coolant temperature, battery voltage, fuel level and the like. The gauges can include an analog or digital readout for displaying the value of the measured parameter. An analog gauge typically includes a dial surface having a numerical scale thereon and a pointer that rotates or traverses across the gauge to a point on the numerical scale which indicates the value of the parameter being monitored.

One limitation of current instrument clusters is their inability to use parameters within the vehicle to resize, reshape, and reconfigure the gauges. Often the driver's line of sight to the instrument cluster is obscured by the steering wheel rim. The wheel must be adjusted from the optimum position for comfort or operation to allow acceptable visibility of the gauges. Accordingly, there exists a need for an instrument cluster that overcomes the aforementioned and other disadvantages.

SUMMARY

This section provides a general summary of the disclosure, and is not a comprehensive disclosure of its full scope or all of its features.

The present disclosure provides an adaptive instrument display that includes an instrument cluster displaying a plurality of gauges. A steering wheel has at least one sensor, and there is at least one camera. A processor collects data from the at least one camera and steering wheel sensor and determines a steering wheel position and an occupant's line of sight. An obstructed portion of the instrument cluster is determined based on the steering wheel position and the occupant's line of sight, and the gauges on the instrument cluster are altered based on the obstructed portion.

In another aspect, a method of adaptive instrument display includes displaying a plurality of gauges. Images of an occupant's eyes are recorded and an angle of a steering wheel is determined. A steering wheel position and an occupant's line of sight are determined from the recorded images and the angle of the steering wheel. An obstructed portion of the instrument cluster is determined based on the steering wheel position and the occupant's line of sight, and the display of the plurality of gauges is altered based on the obstructed portion.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings. The following description is merely exemplary in nature and is not intended to limit the present disclosure, application, or uses.

Figure 1:
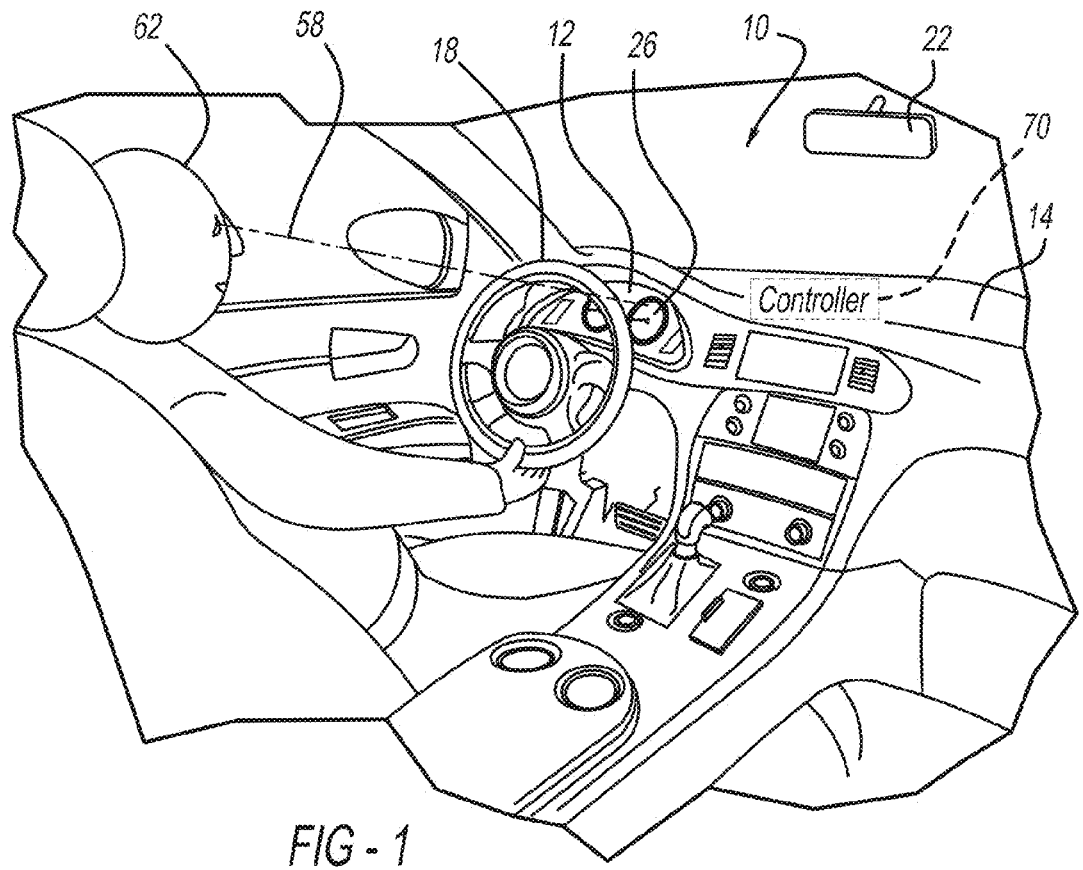
FIG. 1 is a perspective view of a portion of the interior of a vehicle having an adaptive instrument display system using eye tracking in accordance with the present disclosure.
Figure 2:
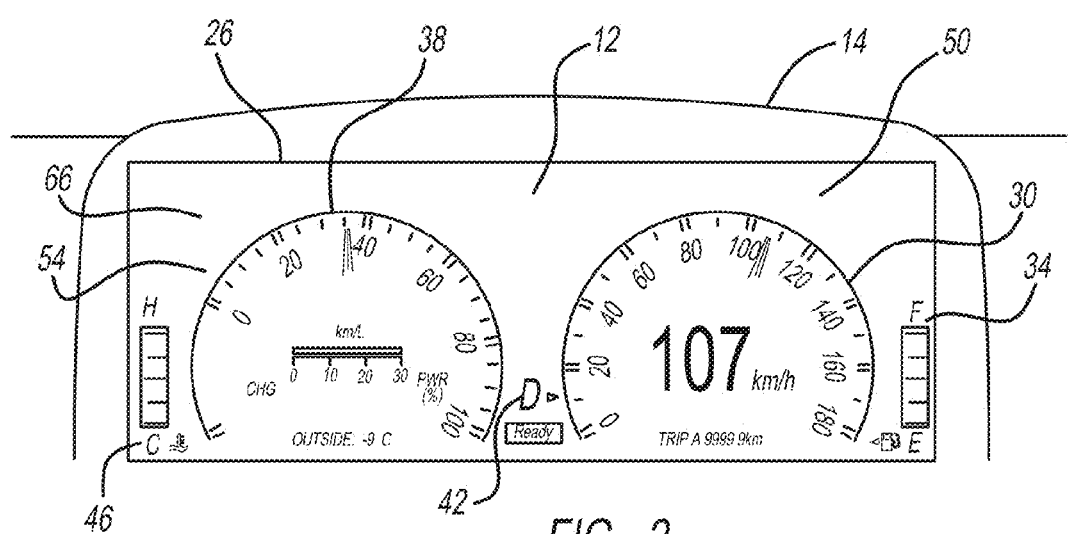
FIG. 2 is a front view of an instrument panel of a vehicle in accordance with the present disclosure.

FIGS. 1-2 illustrate a partial vehicle interior 10 including an adaptive instrument display using eye tracking 12. The adaptive instrument display 12 may include a dashboard 14, a steering wheel 18, a rearview mirror 22 and an instrument cluster 26. The instrument cluster 26 may further include a plurality of gauges or indicating instruments, including, but not limited to, a speedometer 30, a fuel gauge 34, a tachometer 38, a gear indicator 42, and an engine coolant temperature gauge 46. It will be appreciated that other gauges, including but not limited to engine oil temperature, oil pressure, gauges giving information on the ground traction system or door system, and the like can also be included on the instrument cluster. The instrument cluster 26 could be of any suitable type, such as a liquid crystal display and/or an emissive display. Further, it will be appreciated that the instrument cluster 26 could display information that is of an alphanumeric type, a picture type and/or a symbol type.

The instrument cluster 26 includes a screen 50 which defines a surface 54 from which the gauges 30, 34, 38, 42, 46 are displayed. As will be discussed, display of the gauges 30, 34, 38, 42, 46 is changed according to a line of sight 58 of an occupant (for example only, a driver) 62 and the position of the steering wheel 18 in order to make the instrument cluster 26 more legible to the occupant 62.

As shown in FIG. 2, the screen 50 includes a background 66 and the gauges 30, 34, 38, 42, 46 that are displayed adjacent (e.g., displayed within) the background 66. In the embodiments represented by FIG. 2, the background 66 spans substantially over the entire screen 50.

It will be appreciated that the background 66 could be localized about the gauges 30, 34, 38, 42, 46 instead of spanning substantially over the entire screen 50. For instance, the speedometer 30 could be surrounded by a nearby or adjacent background that is different from other portions of the background 66. It will also be appreciated that the adjacent background could be different from the adjacent background for the tachometer. It will also be appreciated that the adjacent background could comprise a boarder that substantially traces the outer periphery of the corresponding gauge 30, 34, 38, 42, 46. The background 66 and gauges 30, 34, 38, 42, 46 may be of different colors or illuminations.

The display system further includes a processor or controller 70. The processor 70 can include circuitry, programmed logic, computer memory, and the like. The processor 70 is in communication with the instrument cluster 26 so as to display and change the gauges 30, 34, 38, 42, 46. As will be explained, the processor 70 transmits control signals to thereby change the location of the gauges 30, 34, 38, 42, 46.

Figure 3:
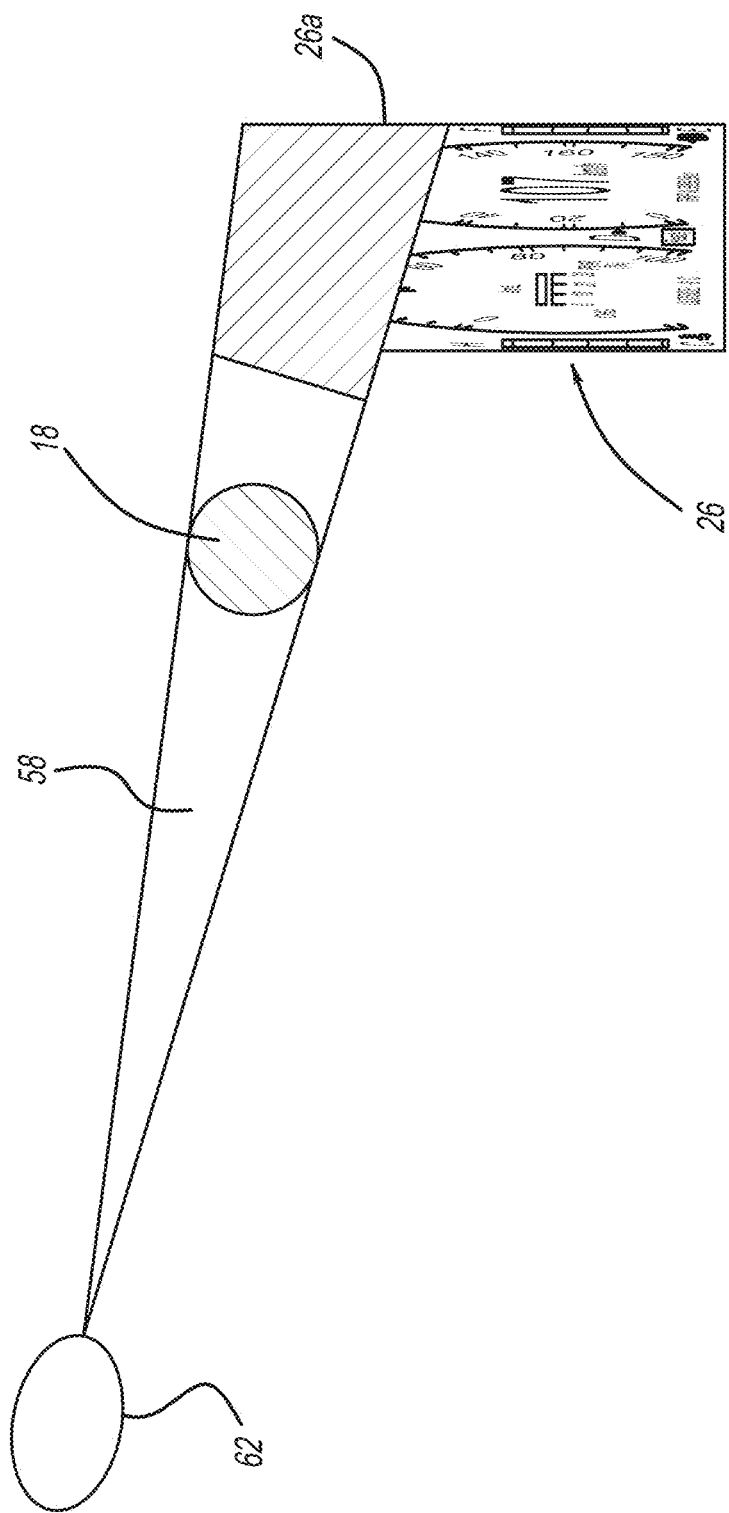
FIG. 3 is a side schematic illustration of a driver's line of sight in relation to a steering wheel and instrument panel in accordance with the present disclosure.

Now referring to FIG. 3, the occupant's 62 line of sight 58 is obscured by the steering wheel 18, blocking the occupant's 62 view of a portion 26a of the instrument cluster 26. The current steering wheel 18 position is determined from position data taken by at least one steering wheel sensor 74. The at least one steering wheel sensor 74 may be located in the steering column or in any other location that is capable of collecting data relating to the location of the steering wheel 18.

The occupant's 62 line of sight 58 is determined based on images taken from at least one camera 78 in the vehicle 10. The camera may be located in the dashboard 14, in the instrument cluster 26, in the rearview mirror 22, or in any other location in the vehicle 10 in which the camera can capture images of the occupant's 62 eyes.

While the current embodiment is illustrated and described as including the steering wheel sensor 74, it is appreciated that the current steering wheel 18 position may also be determined from images taken from the at least one camera 78 in the vehicle 10. The camera 78 may contain a wide enough field of view to capture images both of the occupant's eyes 62 and the steering wheel 18 position, or the vehicle may include a plurality of cameras that capture both the occupant's eyes 62 and the steering wheel 18 position.

Figure 4A:
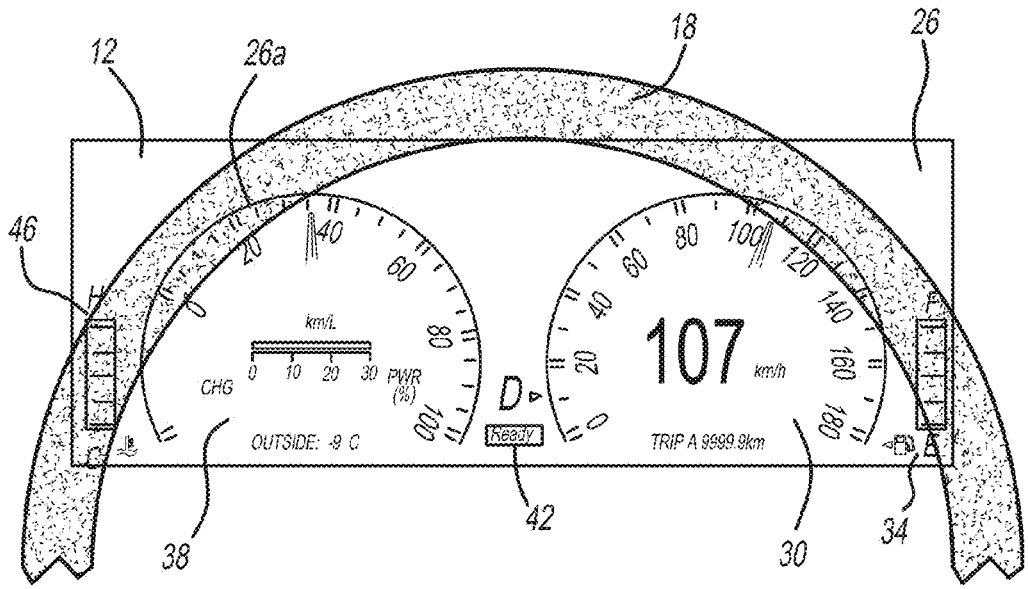
FIG. 4a is a front view of an instrument panel illustrating critical gauges obscured by a steering wheel in accordance with the present disclosure.
Figure 4B:
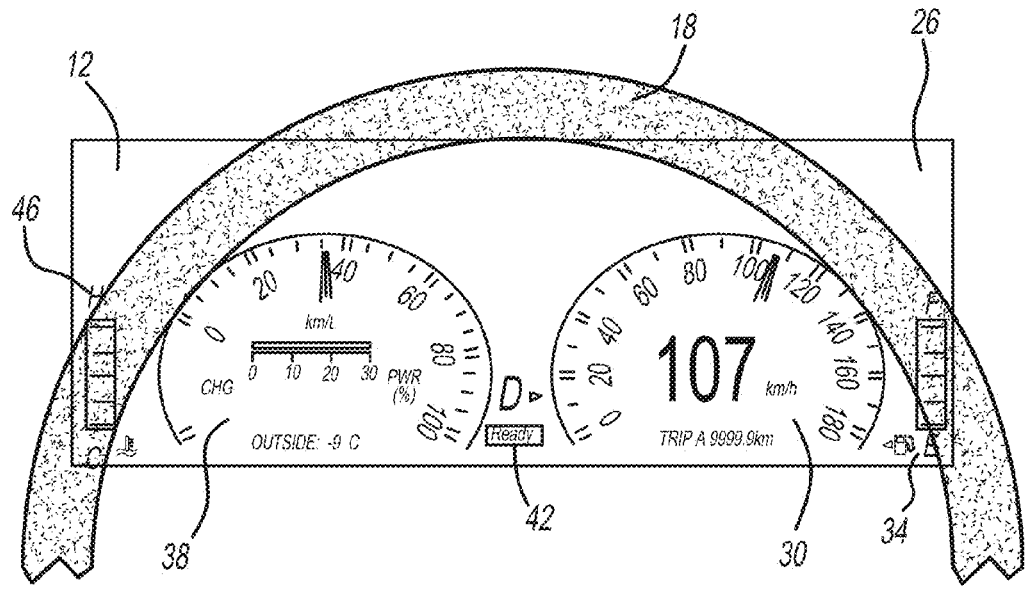
FIG. 4b is a front view of the instrument panel of FIG. 4a where the gauges have been adjusted in accordance with the present disclosure.

Now referring to FIGS. 4a-4b, critical gauges 30, 38 may be resized for visibility when included in the obstructed portion 26a of the instrument cluster 26. The visibility of the gauges 30, 34, 38, 42, 46 is obscured in FIG. 4a because of the location of the steering wheel 18. Based on the location of the steering wheel 18 and the occupant's 62 line of sight 58, the processor 70 resizes the primary gauges (for example only, the speedometer 30 and tachometer 38) 30, 34, 38, 42, 46 as illustrated in FIG. 4b. The secondary gauges (for example only, the fuel gauge 34 and engine coolant temperature gauge 46) 30, 34, 38, 42, 46 may still be obstructed from the occupant's 62 view. Resizing of the primary gauges may be performed when the obstructed portion 26a is smaller than a predetermined threshold (for example only, obstruction of the top ¼ of the critical gauge), or when only a portion of the primary gauges is obstructed from view.

Figure 5A:
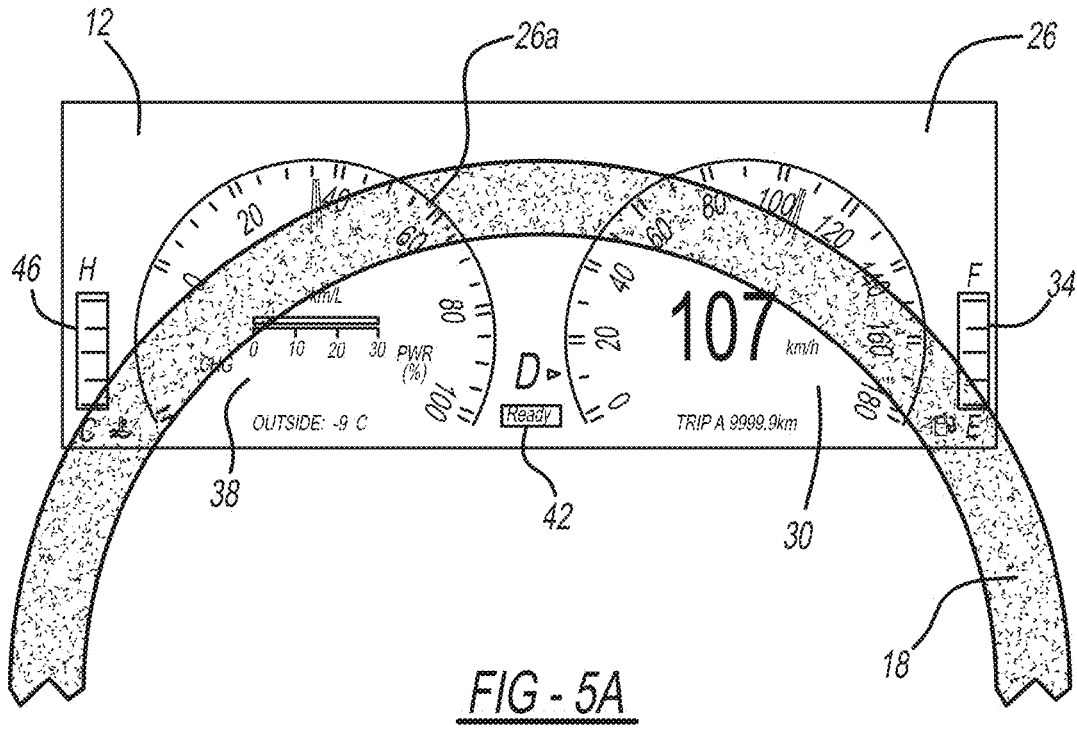
FIG. 5a is a front view of an instrument panel illustrating severe obstruction of critical gauges by a steering wheel in accordance with the present disclosure.
Figure 5B:
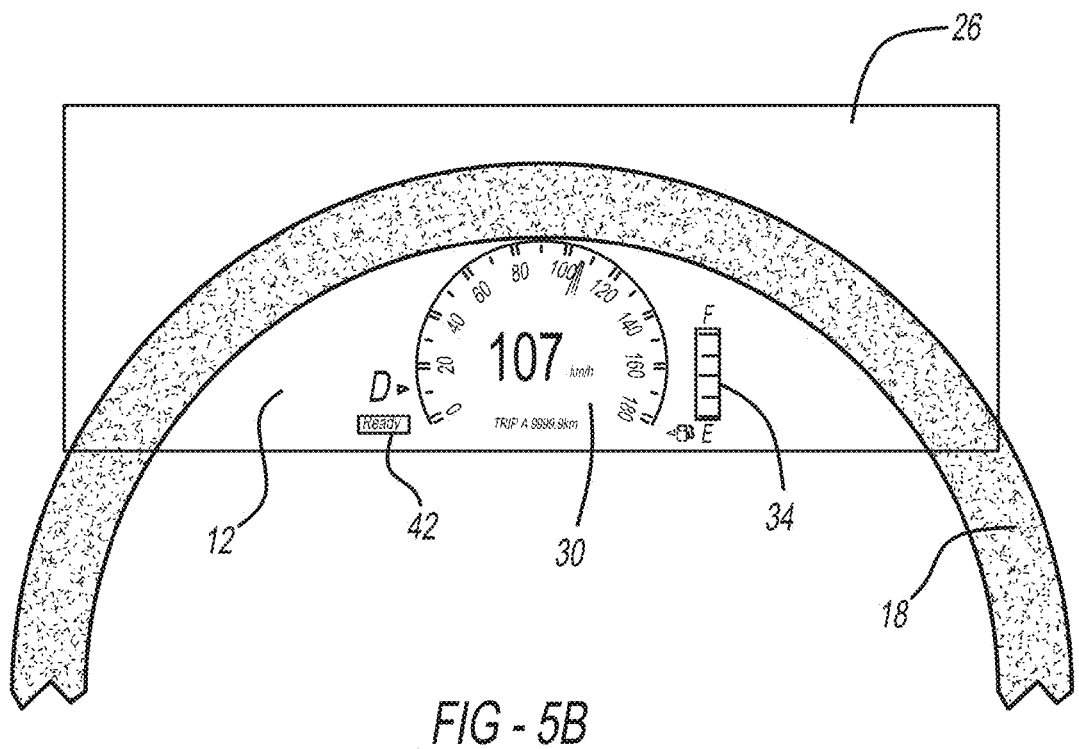
FIGS. 5b-5c are front views of the instrument panel of FIG. 5a where the gauges have been adjusted in accordance with the present disclosure.
Figure 5C:
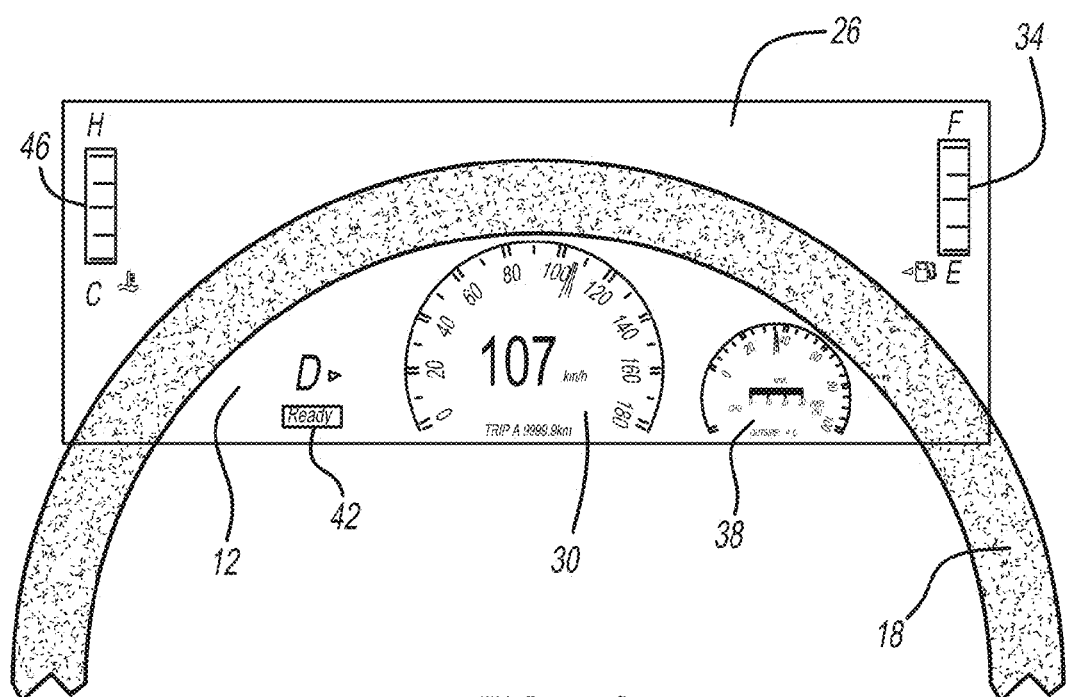

Now referring to FIGS. 5a-5c, the gauges 30, 34, 38, 42, 46 may be removed, reconfigured, or relocated on the instrument cluster 26 when there is severe steering wheel 18 obstruction.

Severe steering wheel 18 obstruction may occur when the steering wheel 18 blocks all, or a large portion, of the critical gauges. The obstructed portion 26a may be larger than the predetermined threshold (for example only, obstruction of ½ of the critical gauge), or the obstructed portion 26a may be located in the middle of the critical gauges (as shown in FIG. 5a) such that resizing of the primary gauges is ineffective.

The non-critical gauges (for example only, the tachometer 38 and engine coolant temperature gauge 46) may be removed automatically, and the critical gauges (for example only, the speedometer 30, fuel gauge 34, and gear indicator 42) may be reconfigured to fit within the occupant's line of sight 58 as illustrated in FIG. 5b. Another option is for the gauges 30, 34, 38, 42, 46 to be relocated and reconfigured so that all gauges fit within the occupant's line of sight 58 as illustrated in FIG. 5c.

Figure 6:
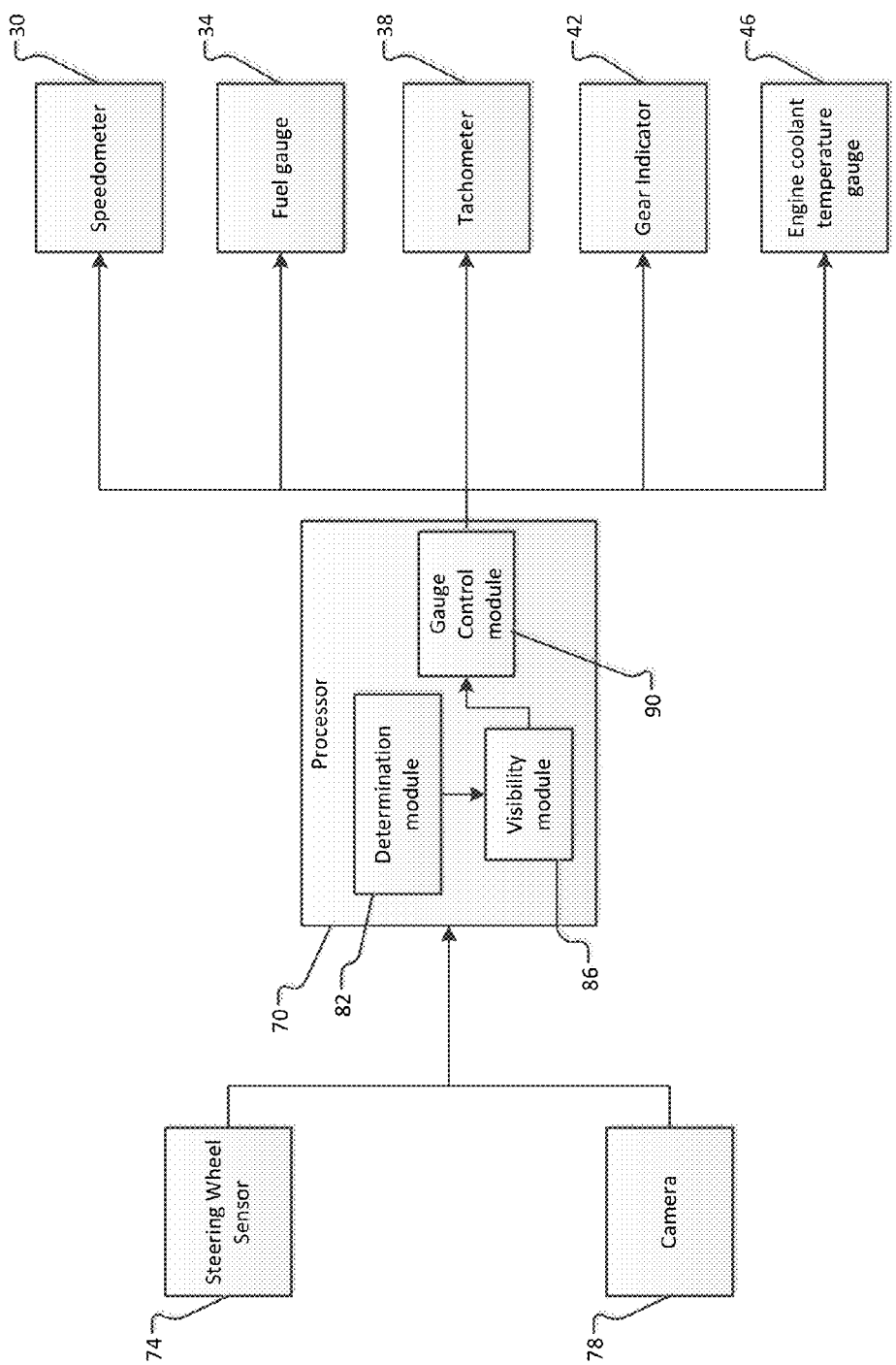
FIG. 6 is a schematic of an adaptive instrument display system using eye tracking according to the present disclosure.

Now referring to FIG. 6, the processor 70 receives data from the at least one steering wheel sensor 74 and at least one camera 78. A determination module 82 in the processor 70 interprets the data and determines the occupant's line of sight 58 and the position of the steering wheel 18. The occupant's line of sight 58 is determined from the data from the at least one camera 78. The determination module 82 may determine the location of the occupant's eyes on both a horizontal and vertical axis and use these coordinates to determine the line of sight (as shown in FIGS. 1 and 3).

The position of the steering wheel 18 is determined by interpreting the data from the at least one steering wheel sensor 74. The at least one steering wheel sensor 74 may detect the position and tilt of the steering wheel. The processor 70 may use the position and tilt, along with the known size and shape of the steering wheel to determine the placement of the steering wheel relative to the occupant's line of sight (as shown in FIG. 3).

While, in the current embodiment, the processor 70 receives data from both the steering wheel sensor 74 and the camera 78, it is appreciated that data relating to the steering wheel position and the occupant's line of sight may be received from only the at least one camera 78. The at least one camera 78 may contain a wide enough field of view to capture images both of the occupant's eyes 62 and the steering wheel 18 position, or the vehicle may include a plurality of cameras that capture both the occupant's eyes 62 and the steering wheel 18 position.

A visibility module 86 in the processor 70 correlates the line of sight 58 and the steering wheel 18 position to determine the obstructed portion 26a of the instrument cluster 26 (see also FIG. 3). A gauge control module 90 in the processor 70 further determines the critical gauges. The critical gauges may be programmed into the processor 70 by a user, or the critical gauges may be determined by the gauge control module 90 based on vehicle operating conditions, user input, or any other parameter.

The gauge control module 90 further determines the resizing, relocation, and/or removal of the gauges 30, 34, 38, 42, 46 and sends a signal to each gauge 30, 34, 38, 42, 46 commanding the resize, reconfiguration, and/or removal. The gauge control module 90 commands resizing of the critical gauges when the obstructed portion is less than the predetermined threshold and is in a location where resizing of the critical gauges is an available remedy (for example only, in the top ¼ of the critical gauges or in the bottom ¼ of the critical gauges as in FIG. 4a). The processor commands removal and/or reconfiguration of the gauges 30, 34, 38, 42, 46 when there is a severe wheel obstruction, such as when the obstructed portion is greater than the predetermined threshold (for example only, when the obstructed portion covers ½ of the critical gauges) or when the obstructed portion is located in an area that eliminates the use of resizing (for example only, when the obstructed portion covers the middle of the critical gauges as seen in FIG. 5a).

Figure 7:
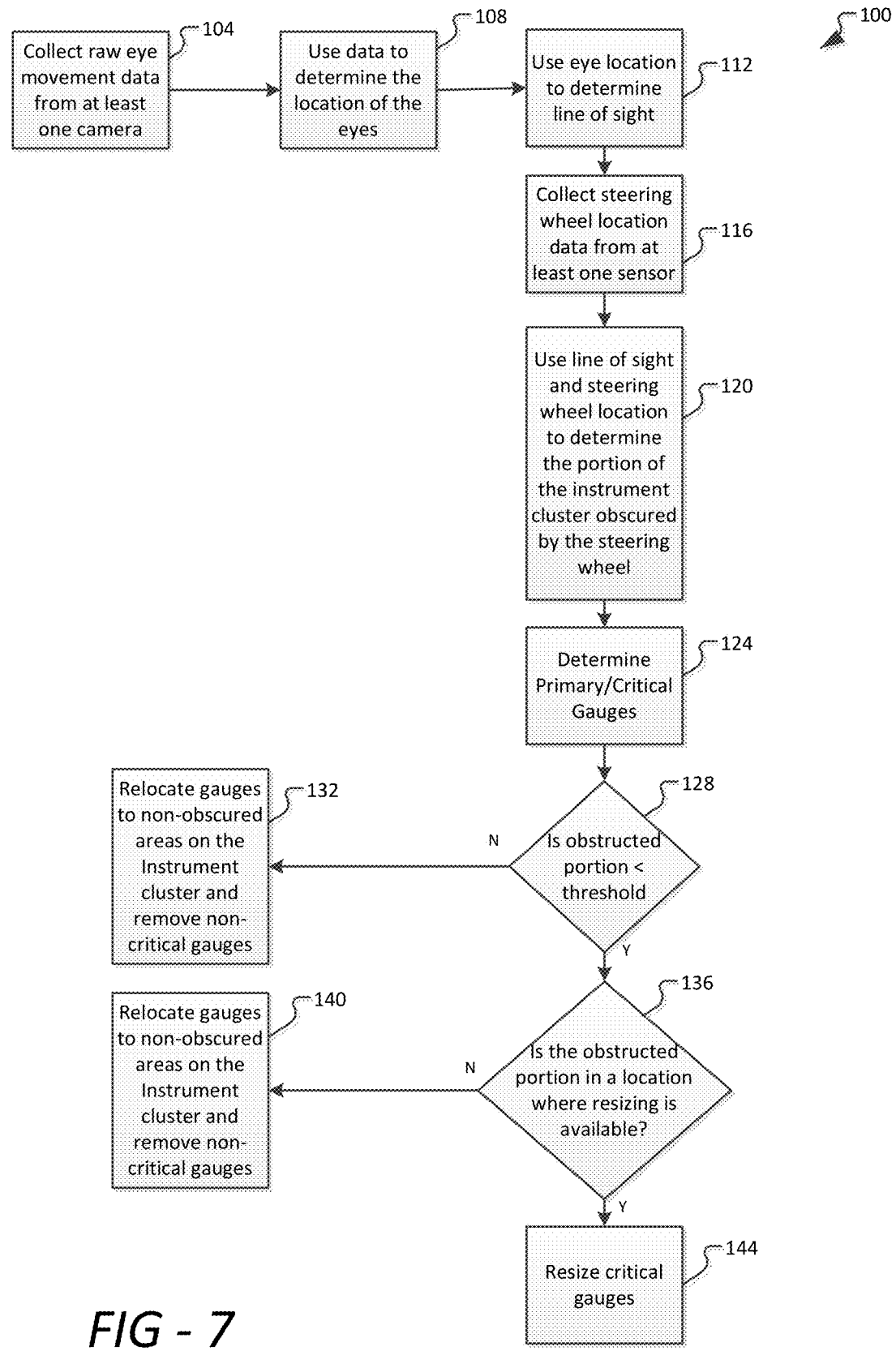
FIG. 7 is a flow chart illustrating a method for an adaptive instrument display system using eye tracking according to the present disclosure.

Referring to FIG. 7, a method for adaptive instrument display using eye tracking 100 is illustrated. At 104, method 100 collects raw eye movement data from at least one camera 78. At 108, method 100 uses the data to determine the location of the occupant's 62 eyes in the vehicle 10. At 112, method 100 uses the eye location to determine the line of sight of the occupant 62. At 116, method 100 collects steering wheel 18 location data from at least one steering wheel sensor 74. At 120, method 100 uses the line of sight and steering wheel location to determine the portion 26a of the instrument cluster 26 obscured by the steering wheel 18. At 124, method 100 determines the primary or critical gauges. At 128, method 100 determines whether the obstructed portion 26a is less than the predetermined threshold. If false, method 100 relocates the critical gauges to non-obscured areas on the instrument cluster and, if necessary, removes non-critical gauges at 132. If true at 128, method 100 determines whether the obstructed portion is in a location where resizing is available at 136. If false, method 100 relocates the critical gauges to non-obscured areas on the instrument cluster and, if necessary, removes non-critical gauges at 140. If true at 136, method 100 resizes the critical gauges at 144.

While, in the current embodiment, the method 100 collects data from both the steering wheel sensor 74 and the camera 78, it is appreciated that data relating to the steering wheel position and the occupant's line of sight may be received from only the at least one camera 78. The at least one camera 78 may contain a wide enough field of view to capture images both of the occupant's eyes 62 and the steering wheel 18 position, or the vehicle may include a plurality of cameras that capture both the occupant's eyes 62 and the steering wheel 18 position. Therefore, the method may be illustrated as in FIG. 8.

Figure 8:
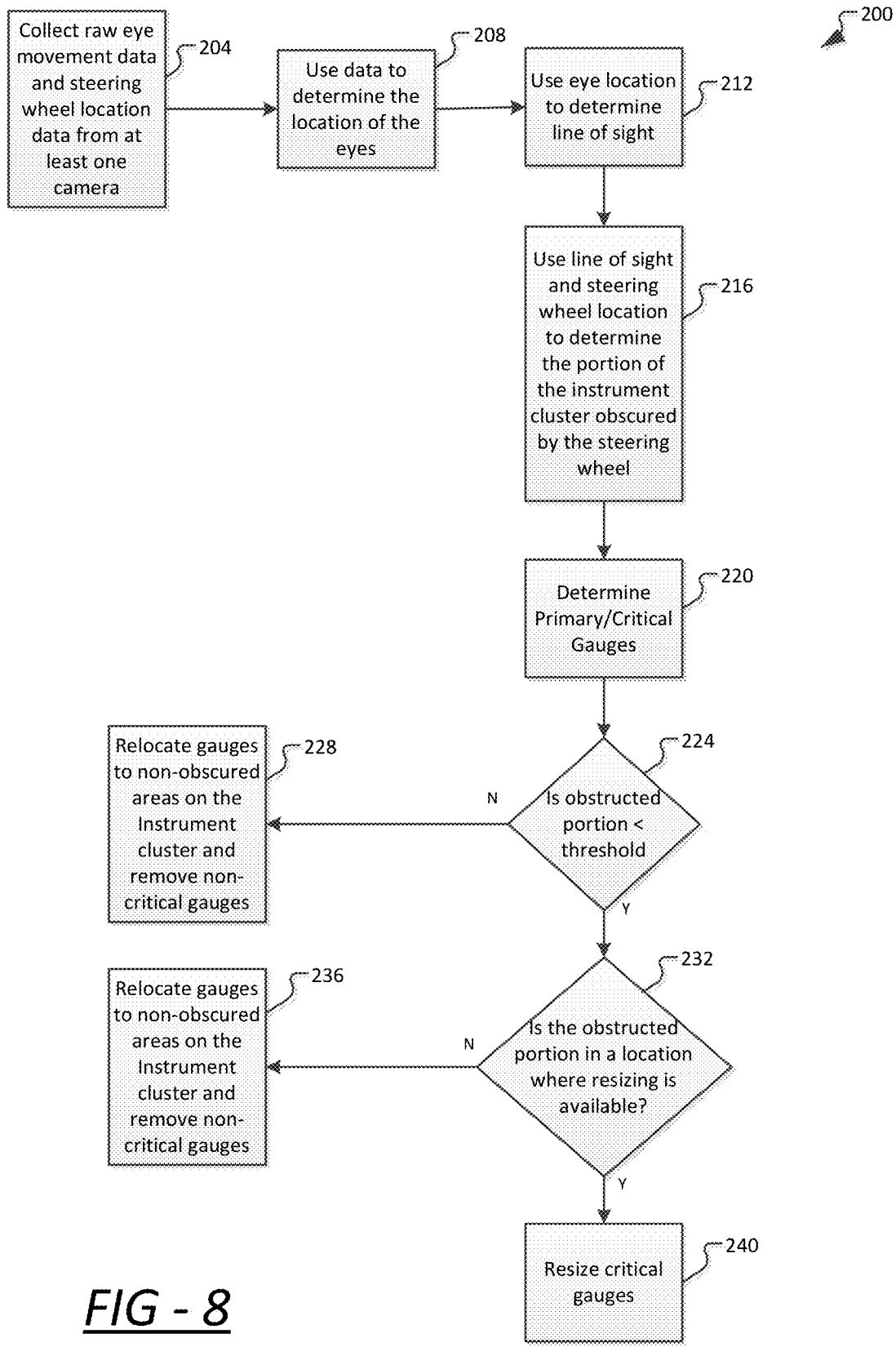
FIG. 8 is a flow chart illustrating another method for an adaptive instrument display system using eye tracking according to the present disclosure.

Now referring to FIG. 8, a method for adaptive instrument display using eye tracking 200 is illustrated. At 204, method 200 collects raw eye movement data and steering wheel position data from at least one camera 78. At 208, method 200 uses the data to determine the location of the occupant's 62 eyes in the vehicle 10. At 212, method 100 uses the eye location to determine the line of sight of the occupant 62. At 216, method 200 uses the line of sight and steering wheel location to determine the portion 26a of the instrument cluster 26 obscured by the steering wheel 18. At 220, method 200 determines the primary or critical gauges. At 224, method 100 determines whether the obstructed portion 26a is less than the predetermined threshold. If false, method 200 relocates the critical gauges to non-obscured areas on the instrument cluster and, if necessary, removes non-critical gauges at 228. If true at 224, method 200 determines whether the obstructed portion is in a location where resizing is available at 232. If false, method 200 relocates the critical gauges to non-obscured areas on the instrument cluster and, if necessary, removes non-critical gauges at 236. If true at 232, method 200 resizes the critical gauges at 240.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. An adaptive instrument display comprising:
   an instrument cluster displaying a plurality of gauges on the display;
   a steering wheel having at least one sensor, at least a portion of the display is visible through the steering wheel;
   at least one camera; and
   a processor collecting data from the at least one camera and steering wheel sensor and determining a steering wheel position and an occupant's line of sight, determining an obstructed portion of the instrument cluster based on the steering wheel position and the occupant's line of sight, and altering the gauges on the instrument cluster based on the obstructed portion;
   wherein:
      the processor determines at least one critical gauge; and
      the processor at least one of resizes, removes, reconfigures, and relocates the at least one critical gauge on the display if the obstructed portion includes part of the at least one critical gauge, the display is a single display.

2. The adaptive instrument display of claim 1, wherein the at least one critical gauge is at least one of a speedometer, a tachometer, a gear indicator, a fuel gauge, and an engine coolant temperature gauge.

3. The adaptive instrument display of claim 1, wherein the processor reconfigures the gauges if the steering wheel obscures a portion of the instrument cluster that is greater than a predetermined amount of the instrument cluster.

4. The adaptive instrument display of claim 1, wherein the processor reconfigures the gauges if the steering wheel obscures greater than a predetermined amount of the critical gauge.

5. The adaptive instrument display of claim 1, wherein the processor reconfigures the gauges if the obstructed portion is located in the center of the critical gauge.

6. The adaptive instrument display of claim 1, wherein the processor removes gauges that are not critical gauges and reconfigures the at least one critical gauge if at least one of the steering wheel obscures greater than half of the critical gauge and the obstructed portion is located in the center of the critical gauge.

7. The adaptive instrument display of claim 1, further comprising a rearview mirror housing the camera.

8. The adaptive instrument display of claim 1, wherein the camera is housed in the instrument cluster.

9. The adaptive instrument display of claim 1, further comprising a steering column housing the steering wheel sensor.

10. The adaptive instrument display of claim 1, wherein the processor determines the location of the occupant's eyes within the vehicle to determine the occupant's line of sight.

11. A method of adaptive instrument display comprising:
   displaying a plurality of gauges on a display, at least a portion of which is visible by an occupant through a steering wheel;
   recording images of the occupant's eyes;
   determining an angle of the steering wheel;
   determining a steering wheel position and an occupant's line of sight from the recorded images and the angle of the steering wheel;
   determining an obstructed portion of the instrument cluster based on the steering wheel position and the occupant's line of sight;

altering the display of the plurality of gauges based on the obstructed portion;

determining at least one critical gauge; and at least one of resizing, removing, reconfiguring, and relocating the at least one critical gauge if the obstructed portion includes part of the at least one critical gauge.

12. The method of adaptive instrument display of claim 11, wherein the at least one critical gauge is at least one of a speedometer, a tachometer, a gear indicator, a fuel gauge, and an engine coolant temperature gauge.

13. The method of adaptive instrument display of claim 11, further comprising reconfiguring the gauges if the steering wheel severely obscures the instrument cluster.

14. The method of adaptive instrument display of claim 11, further comprising removing gauges that are not critical gauges and reconfiguring the at least one critical gauge if the steering wheel severely obscures the instrument cluster.

15. The method of adaptive instrument display of claim 11, further comprising determining the location of the occupant's eyes within the vehicle to determine the occupant's line of sight.

16. The method of adaptive instrument display of claim 11, wherein the images of the occupant's eyes are recorded using a camera located in a rearview mirror.

17. The method of adaptive instrument display of claim 11, wherein the images of the occupant's eyes are recorded using a camera located in an instrument cluster.

18. An adaptive instrument cluster comprising:

a display configured to display a plurality of gauges including at least one critical gauge, the at least one critical gauge including at least one of a speedometer, a tachometer, a gear indicator, a fuel gauge, and an engine coolant temperature gauge;

a steering wheel;

a steering wheel detector configured to detect location of the steering wheel relative to the display and the plurality of gauges;

an eye detector configured to determine a driver's line of sight relative to the display, the steering wheel, and the plurality of gauges; and a processor configured to detect obstruction in the driver's line of sight of the at least one critical gauge by the steering wheel, and at least one of resize, reconfigure, and relocate the at least one critical gauge on the display such that the at least one critical gauge is not obstructed by the steering wheel;

wherein the display is positioned such that at least a portion of the display is visible by the driver through the steering wheel.

19. The adaptive instrument cluster of claim 18, wherein the processor is configured to at least one of resize, reconfigure, and relocate the at least one critical gauge such that the at least one critical gauge is not obstructed by the steering wheel and visible through the steering wheel.

20. The adaptive instrument cluster of claim 18, wherein the processor is further configured to remove the at least one critical gauge when obstructed by the steering wheel.

\* \* \* \* \*